(12) United States Patent
Yoshida

(10) Patent No.: US 6,205,536 B1
(45) Date of Patent: Mar. 20, 2001

(54) COMBINED INSTRUCTION AND ADDRESS CACHING SYSTEM USING INDEPENDENT BUSES

(75) Inventor: Toyohiko Yoshida, Itami (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/113,509

(22) Filed: Aug. 27, 1993

Related U.S. Application Data

(63) Continuation of application No. 07/547,886, filed on Jul. 2, 1990, now abandoned.

(30) Foreign Application Priority Data

Jul. 5, 1989 (JP) .................................................. 7-174883

(51) Int. Cl.[7] .............................................. G06F 13/42
(52) U.S. Cl. ................................................ 712/38; 710/35
(58) Field of Search .................................... 395/400, 425

(56) References Cited

U.S. PATENT DOCUMENTS 4,851,990 * 7/1989 Johnson et al. ..................... 395/325
4,992,934 * 2/1991 Portanoua et al. ................... 395/550
5,034,887 * 7/1991 Yasui et al. ......................... 395/800

OTHER PUBLICATIONS

"AM 29000 User's Manual," Advanced Micro Devices, Inc., pp. 5–1 to 5–11, A–3, A–16 and A–17, Feb. 1987.

"Clipper Module Product Diescription," Fairchild 1985, pp. 1 to 5.

"80386 High Performance Microprocessor with Integrated Memory Mangement," Intel Corp. '85 pp. 65–69.

* cited by examiner

Primary Examiner—Richard L. Ellis
(74) Attorney, Agent, or Firm—Townsend and Townsend and Crew LLP

(57) ABSTRACT

A microprocessor and a data processor therefor which have separate data and instruction buses, and wherein a data address and an instruction address are output over a single address bus in a time-shared manner, thereby allowing a data access and an instruction access to be pipelined without the need for separate address buses between the microprocessor and caches holding data and instructions.

12 Claims, 15 Drawing Sheets (SERIAL BIT NUMBER)

0　　　　7　8　　　　　15　16　　　　23　24　　　　31

(BIT NUMBER IN EACH BYTE)

N　　　　N+1　　　N+2　　　N+3
　　└─204　　└─206

(ADDRESS)
　　　　　　　　　　　　　　　　　　　┌─202
←LOW ADDRESS　　　　　　HIGH ADDRESS→
←MSB SIDE　　　　　　　　　　LSB SIDE→

→→DIRECTION OF READ INSTRUCTION→→

Fig. 25

| BAT | ADDRESS BUS | DATA BUS H | DATA BUS L | INSTRUCTION BUS |
|---|---|---|---|---|
| 000 | DATA ADDRESS | DATA H | DATA L | RESERVED |
| 001 | INSTRUCTION ADDRESS | RESERVED | RESERVED | INSTRUCTION CODE |
| 100 | COMMAND | OPERAND H | OPERAND L | RESERVED |
| 101 | COMMAND | RESERVED | PC VALUE | RESERVED |
| OTHERS | RESERVED | RESERVED | RESERVED | RESERVED |

COMBINED INSTRUCTION AND ADDRESS CACHING SYSTEM USING INDEPENDENT BUSES

This is a Continuation of application Ser. No. 07/547,886, filed Jul. 20, 1990, now abandoned.

BACKGROUND OF THE INVENTION

1. Field of the Invention

The present invention relates to a data processor and a microprocessor therefor which make it possible to efficiently access a memory using a high-speed bus protocol.

2. Description of Related Art

As the performance of data processors has increased, the width of microprocessor data buses in data processors connecting to memories has gradually extended from four bits to eight bits, then to 16 bits and 32 bits. In a data processor, the speed of processing instructions and data greatly affects the data processor's performance.

For example, in order to process data in a memory-to-register operation in one clock cycle, the memory data and instruction need to be read in one clock cycle. One solution that has been developed is a processor with a separate data bus for accessing data operands and an instruction bus for accessing instruction codes.

A data processor providing independent data and instruction buses, is known in the art. For example, the "AM29000" made by Advanced Micro Devices, Inc. or the "CLIPPER" made by Fairchild Semiconductor, are such processors. These data processors are described in detail in the "AM29000 User's Manual" (Advanced Micro Devices, Inc., 1987) or "CLIPPER Module Product Description" (Fairchild Semiconductor, 1985).

The AM29000 has a 32-bit instruction bus, a 32-bit data bus and a 32-bit address bus. To access an instruction, the processor outputs an instruction address onto the address bus, and inputs the instruction from the instruction bus. To access data, the processor outputs a data address onto the address bus, and inputs/outputs data through the data bus. A burst transfer mode which accesses consecutive instructions or data locations in response to one address on the address bus is also supported.

The "CLIPPER" has a multiplexed, 32-bit instruction address bus which handles instruction addresses and instructions and a multiplexed, 32-bit data address bus which handles data addresses and data.

The so-called address pipelining method has also been developed to speed transferring instructions and data, while keeping the memory access time constant, by outputting the address in advance of a memory access cycle. An example of address pipelining is provided by the "i80386" made by Intel Corporation, and this function is described in detail in the publication "80386 High Performance Microprocessor With Integrated Memory Management" (Intel Corporation, 1985).

FIG. 1 shows a conventional data processor, which comprises a CPU 71, an instruction address bus 81, an instruction bus 82, a data address bus 84 and a data bus 85, wherein an instruction cache 72 and a data cache 73 independently execute an instruction access and a data access, respectively.

CPU 71 accesses instruction cache 72 by sending/receiving control signals through an instruction control bus 83 and using instruction address bus 81 and instruction bus 82. Also, CPU 71 accesses data cache 73 by sending/receiving control signals through a data control bus 86 and using data address bus 84 and data bus 85. When a cache miss occurs, CPU 71 sends and receives control signals through to a memory control bus 88 and using a memory address bus 87 and a memory data bus 89 causes instruction cache 72 or data cache 73 to access a main memory 74.

As described above, various attempts have been made to improve the transferring ability of the bus in the conventional data processor. However, an increase in the number of bits or an increase in the number of buses incurs an increase in the number of pins, and thereby increasing the cost of the microprocessor, the data processor using the microprocessor, and the system incorporating the data processor. Although the transfer speed of the bus can be increased by increasing the clock rate, an increase in the clock rate will increase the cost of the processor, as faster circuits are needed.

In a data processor using the "AM29000" as a microprocessor, one address bus is used for both instruction access and data access. Therein, instructions and data cannot be simultaneously access. This is true for single accesses, as well as in the burst mode. For this reason, where instructions and data are accessed alternately, one by one, the address output creates a bottleneck despite the fact that the data bus and the instruction bus are independent, and a processor time equal to a sum of the time of instruction access and the time of data access is required.

In the "CLIPPER" data processor, access to instruction codes and access to data are performed by independent buses, and, therefore, both accesses can be performed separately, thus avoiding the problems of the "AM29000". However, when executing an instruction read or a data read, it is necessary to input the instruction or data immediately after the processor has output the address, and the signal direction on bus must reverse quickly. Accordingly, the circuit design of buses for this system becomes more difficult as the system clock frequency controlling the whole apparatus increases.

In a system having address pipelining, access time to memory can be increased by outputting the address in advance, but the access time needed for one instruction or one data access is not reduced. For this reason, a non-pipeline access mode is needed that does not output the address in advance to improve performance. Consequently, the two modes need to be supported and the system design is complicated.

In the example in FIG. 1, the instruction cache 72 and the data cache 73 can be accessed independently, and the CPU 71 can be operated efficiently. However, two address buses for instruction address bus 81 and the data address bus 84 are required, and the number of pins for CPU 71 and the number of pins for the data processor are increased, resulting in increased cost. To reduce address skew by the address bus, all bits must be transferred without a deviation in timing. For this reason, a stable power source and a stable ground potential must be supplied for the address output circuit of the microprocessor, and where the number of address buses increases from one to two, not only do the number of pins increase by the number of bits, but the power source and ground wiring must also be increased at the same time.

SUMMARY OF THE INVENTION

The principal object of the present invention is to provide data processor using a microprocessor as a CPU, the system having an independent data bus and an independent instruction bus, and performing data accesses and instruction accesses efficiently without increasing the number of address bus lines used for output by adopting a configuration where the data address and the instruction address are output by on a single address bus in a time-shared manner.

The data processor and the microprocessor of the present invention comprises 32-bit address bus for transferring instruction and data addresses, a 32-bit instruction bus for transferring instructions and a 64-bit data bus for transferring data. Also, two systems of bus control signals controlling the instruction access cycle and the data access cycle in an independent manner are provided. The two systems of bus access signals include an instruction valid signal showing that the instruction address output to the address bus is valid, a data address valid signal showing that the data address output to the address bus is valid, an instruction transfer end signal indicating the end of an instruction access cycle and a data transfer end signal indicating the end of a data access cycle. Besides these signals, an access type signal is provided which indicates the type of address, either instruction or data, being transferred on the address bus.

In the data processor and the microprocessor of the present invention, data addresses and instruction addresses are transferred using the address bus, data is transferred on the data bus, and instructions are transferred on the instruction bus. The type of the address transferred by the address bus is identified by the access type signal. The data access cycle is controlled by the data address valid signal, the data transfer end control signal and the like, while the instruction access cycle is controlled by the instruction address valid signal, the instruction transfer end control signal and the like.

In a data access cycle, a data address is transferred over the address bus, and an instruction address can be transferred over the address bus before the data transfer ends. In an instruction access cycle, an instruction address is transferred over the address bus, and a data address can be transferred over the address bus before the instruction transfer ends. The data access cycle can be executed in a minimum of two clocks, and the instruction cycle can also be executed in a minimum of two clocks, however, the address bus transfers two addresses in every two clocks: one data address and one instruction address.

The above and further objects and features of the invention will more fully be apparent from the following detailed description with accompanying drawings.

BRIEF DESCRIPTION OF THE DRAWINGS

FIG. 25 is a table showing assignment of the BAT(0:2) signals;

DESCRIPTION OF THE PREFERRED EMBODIMENT

Hereinafter, a detailed description of the present invention is provided based on the drawings showing one embodiment thereof.

(1) An embodiment of a Data Processor according to the Present Invention

Figure 1:
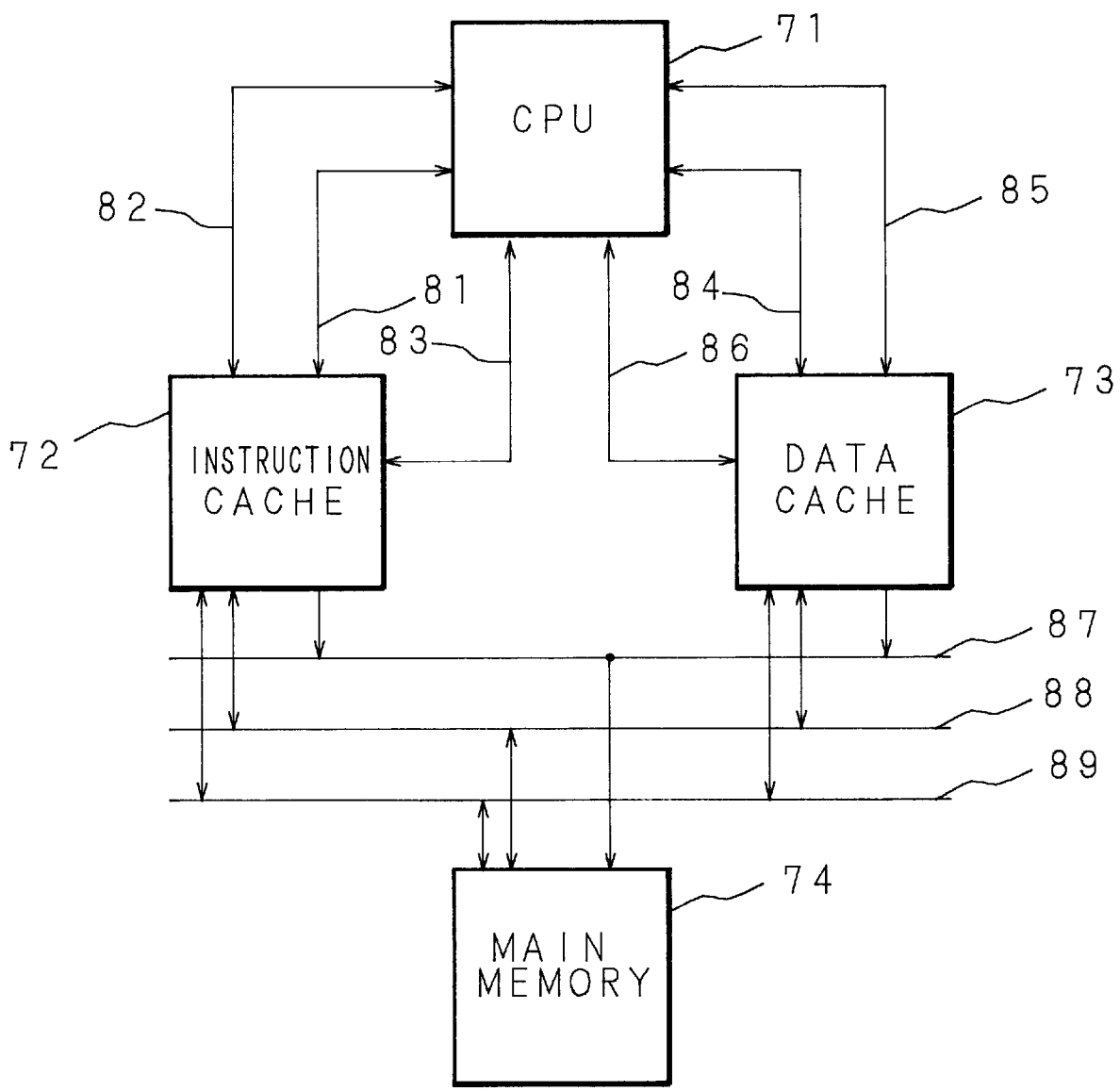
FIG. 1 is a block diagram showing a conventional data processor with an independent instruction address bus and an independent data address bus.
Figure 2:
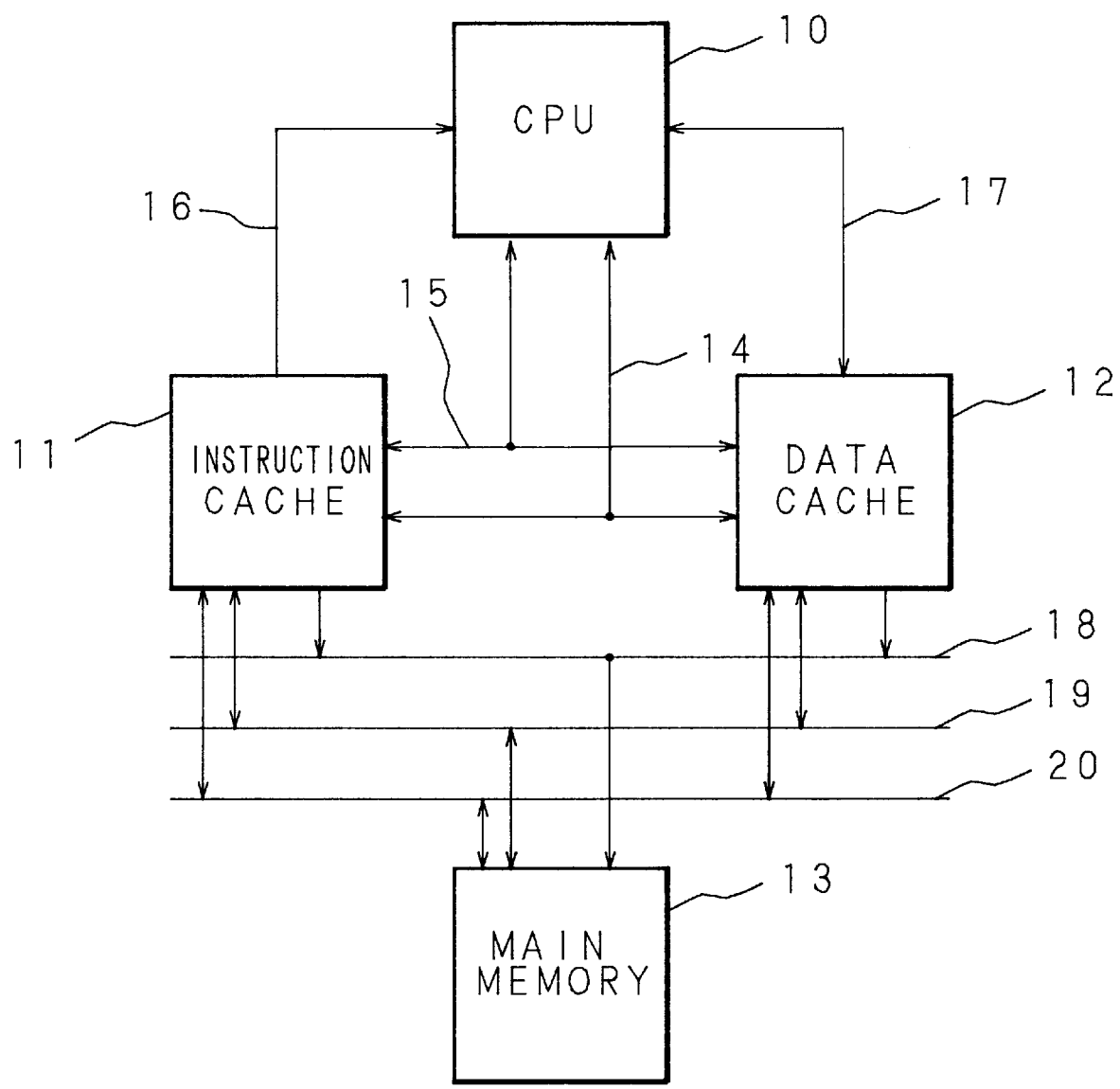
FIG. 2 is a block diagram showing an embodiment of a data processor according to of the present invention.

FIG. 2 is a block diagram showing an embodiment of a data processor according to the present invention.

In this embodiment, a CPU 10, a microprocessor, an instruction cache 11, a data cache 12 and a main memory 13 are connected by an address bus 14, a CPU-side control bus 15, an instruction bus 16, a data bus 17, a memory address bus 18, a memory-side control bus 19 and a memory data bus 20.

Address bus 14 is used to transfer addresses from CPU 10 to instruction cache 11 and data cache 12.

Instruction bus 16 is used to transfer instruction codes from instruction cache 11 to CPU 10.

The data bus 17 is used to transfer from CPU 10 to data cache 12, and from data cache 12 to CPU 10.

CPU-side control bus 15 connects CPU 10 to instruction cache 11 and data cache 12, and communicates control signals between CPU 10 and the two caches.

Memory address bus 18 is used to transfer addresses from instruction cache 11 or data cache 12 to main memory 13.

Memory data bus 20 is used to transfer instructions or data between main memory 13 and instruction cache 11 or data cache 12.

Memory-side control bus 19 is connected to main memory 13, instruction cache 11 and data cache 12, and communicates control signals between main memory 13 and the two caches.

Next is a description of instruction formats and the processing mechanism of CPU 10. A description of the operations of address bus 14, instruction bus 16, CPU-side control bus 15 and data bus 17 then follows.

(2) Instruction Formats

Instructions for CPU 10 comprise one or more 16-bit words, thus, no instructions are made up of an odd number of bytes.

The instruction format is specifically devised so that frequently used instructions use a shorter format as compared to rarely used instructions. For example, two formats are provided for two-operand instructions: a general format which is four bytes plus extensions which allows for the utilization of all addressing modes and a short format which allows for only the use of more common instructions and addressing modes.

Figure 3:
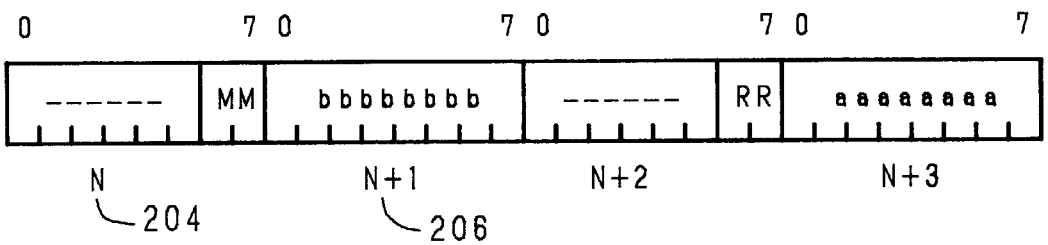
FIG. 3 is a schematic diagram showing an arrangement of an instruction in a data processor according to the present invention.

The meaning of symbols appearing in the instruction formats shown in FIGS. 3–7 are as follows:

Field Description of Field
- Operation Code
- Ea Designates operands in a general 8-bit addressing mode
- Sh Designates operands in a short 6-bit addressing mode
- Rn Designates operands in a register addressing mode In the format shown in FIG. 3, the least significant bit of the instruction is on the right 202. The instruction format can be discerned from reading address N 204 and address N+1 206. This is acceptable, since the instruction is always fetched and decoded on a 16-bit (2-byte) unit basis.

In each instruction format, the extension fields Ea and Sh are in the second byte of the instruction word comprising the base fields of an Ea or Sh instruction. This takes precedence over the immediate data specified implicitly by the instruction or the extension part of the instruction. Accordingly, in an instruction of four or more bytes, the operation code of the instruction can be determined from the extension field Ea.

Also, as described later, where an additional extension field is attached to the Ea extension field in a chained addressing mode, this field takes precedence over the next operation field. For example, consider the case of 6-byte instruction which comprises Ea1 in a first half word, Ea2 in a second half word, and ends with a third half word.

Since the chained addressing mode is used for Ea1, another extension field of the chained addressing mode is assumed to be attached in addition to the ordinary extension field, and the actual instruction bit pattern is composed, in sequence, of the first half word of the instruction (including the base field of Ea1), the expansion field of Ea1, the chained addressing mode extension field, the second half word of the instruction (including the base field of Ea2), the expansion field of Ea1 and the third half word of the instruction.

(2.1) Short-Format Two-Operand Instructions

Figure 4:
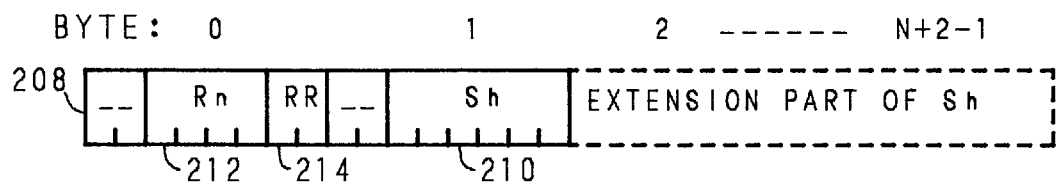
FIG. 4 shows an instruction format for an operation using a register value and a memory value as operands.

FIG. 4 is a schematic diagram showing a format 208 of an instruction for an operation between memory and a register. This format includes an L-format, wherein the source operand is a memory location and an S-format, wherein the destination operand is a memory location.

In the L-format, field Sh 210 indicates the location of the source operand; field Rn 212 indicates the register of which is the destination operand, and field RR 214 indicates the operand size of Sh 210. The size of a destination operand in a register is fixed at 32 bits. Where the size of the resister operand differs from the memory operand and the source operand is smaller, sign extension is performed on the value stored as the destination operand.

In the S-format, field Sh 210 indicates the location of the destination operand; field Rn 212 indicates the register which is the source operand, and field RR 214 indicates the operand size of Sh 210. The size of a source operand in a register is fixed at 32 bits. Where the size of the register operand differs from the memory operand and the source operand side is larger, the operand is shortened by the overflow portion and an overflow check is done.

(2.2) General Format One-Operand Instructions

Figure 5:
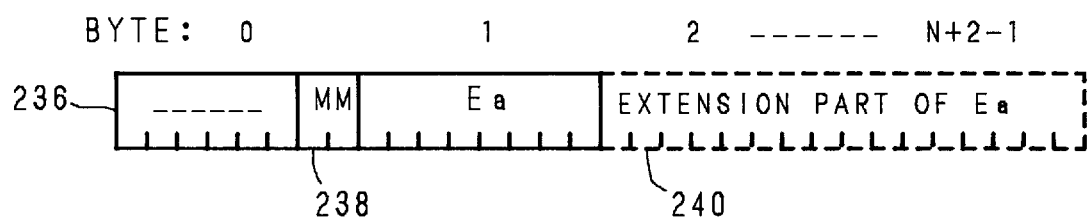
FIG. 5 shows a format for a one-operand instruction.

FIG. 5 is a schematic diagram showing a general format 236 for one-operand instructions (G1-format).

In FIG. 5, field MM 238 indicates the operand size. Some of the G1-format instructions comprise an extension field other than an Ea 240 field. There are also instructions using no MM 238 field.

(2.3) General Format Two-Operand Instructions

Figure 6:
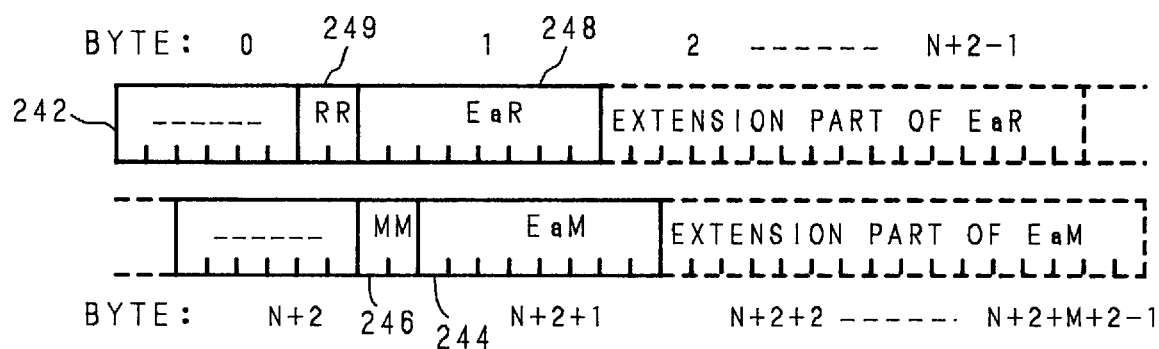
FIG. 6 shows a format for a two-operand instruction.

FIG. 6 is a schematic diagram general formats for two-operand instructions. These formats comprise an instruction having a maximum of two general-type addressing mode operands, which are eight bits wide. Some instructions have three or more operands.

In FIG. 6, field EaM 244 indicates the destination operand; field MM 246 indicates the destination operand size; field EaR 248 indicates the source operand, and RR field 249 indicates the size of the source operand. Some of the G-format instructions comprise an extension field other than the extension field EaR 248.

Figure 7:
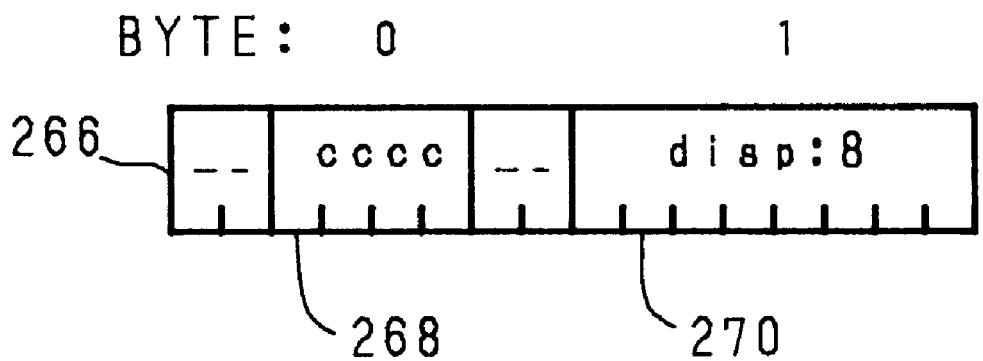
FIG. 7 shows a format for a short branch instruction.

FIG. 7 is a schematic diagram showing a format 266 for a short branch instruction.

In FIG. 7, field cccc 268 indicates a branch condition and the field disp:8 270 indicates a displacement to a jump destination. For displacements indicated by eight bits, the displacement value is found by doubling the indicated eight-bit value.

(2.4) Addressing Modes

Methods of designating an addressing mode of the data processor and the microprocessor of the present invention include short addressing modes using six bits, and register and general addressing modes using eight bits.

Where an undefined addressing mode, or a combination of unsuitable addressing modes exits in an instruction, a reserved instruction exception is generated. Furthermore, the execution of an undefined instruction initiates exception processing.

Such invalid instructions include, for example, an instruction where the destination operand is an immediate mode value where the immediate mode is used in the field designating an addressing mode which is to be accompanied by address calculations.

Symbols used in the format diagrams, FIGS. 8–18, are as follows (fields surrounded by dashed lines are extension fields):

| Field | Description of Field |
|---|---|
| Rn | Register addressing mode |
| (Sh) | Short addressing mode (six bits) |
| (Ea) | General addressing mode (eight bits) |

(2.4.1) Basic Addressing Modes

The data processor and the microprocessor of the present invention support various addressing modes including a register direct mode, a register indirect mode, a register relative indirect mode, an immediate mode, an absolute mode, a Program Counter (PC) relative indirect mode, a stack pop mode and a stack push mode.

Figure 8:
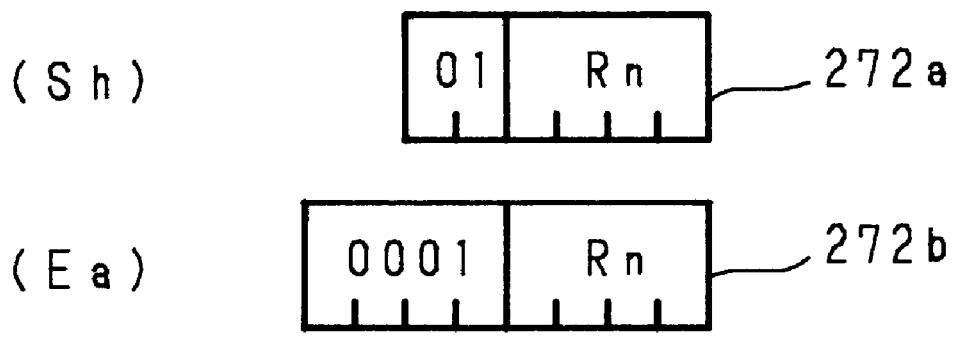
FIG. 8 shows a format for a register direct addressing mode instruction.

The register direct mode uses the contents of a register as an operand. FIG. 8 is a schematic diagram of the format thereof. The fields Rn 272a, 272b indicates the general-purpose register number of the register to be operated upon.

Figure 9:
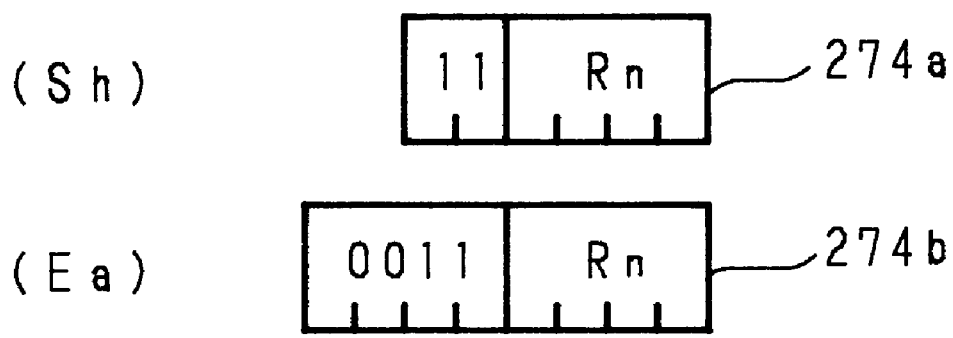
FIG. 9 shows a format for a register indirect addressing mode instruction.

The register indirect mode uses, as an operand, the contents of a memory location whose address is contained in a register. FIG. 9 is a schematic diagram of the format thereof. The fields Rn 274a, 274b indicate the general-purpose register used to hold the memory address.

Figure 10:
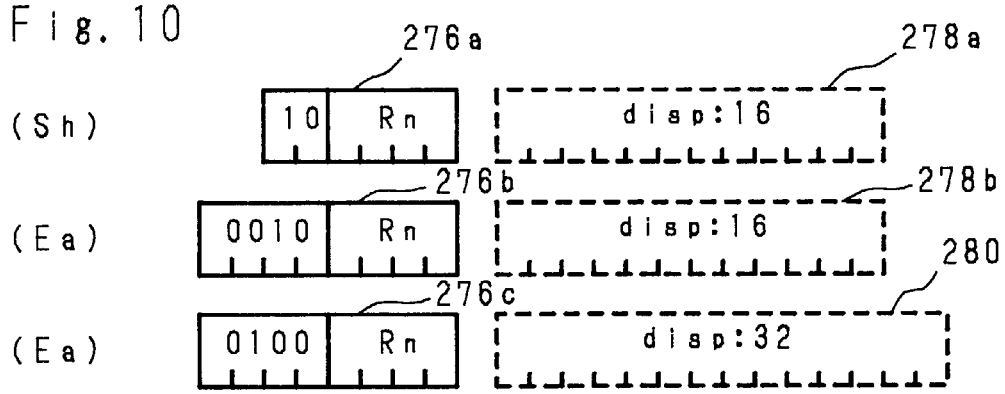
FIG. 10 shows a format for a register relative, indirect addressing mode instruction.

The register relative indirect mode includes two displacement values (16 bits and 32 bits). Each takes as an operand the contents of a memory location whose address is the value of the contents of the register plus the displacement value of 16 bits or 32 bits. FIG. 10 is a schematic diagram of the format thereof. The fields Rn 276a, 276b and 276c indicate which general-purpose register is used. The fields disp:16 278a, 278b and disp:32 280 indicate a displacement value of 16 bits and a displacement value of 32 bits, respectively. The displacement value is handled as a signed binary number.

Figure 11:
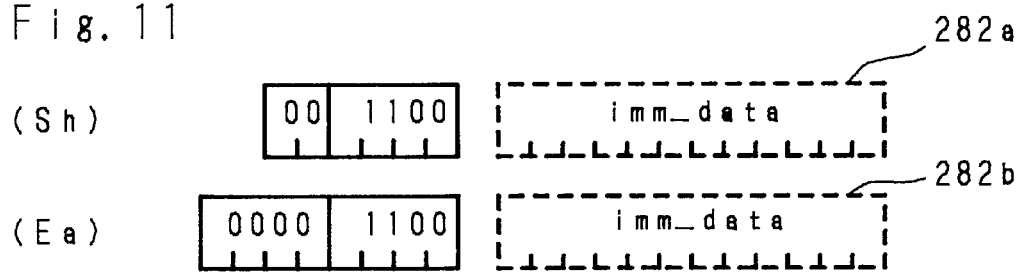
FIG. 11 shows a format for an immediate addressing mode instruction.

The immediate mode uses a bit pattern in the instruction code itself as a binary number operand. FIG. 11 is a schematic diagram of the format thereof. The fields symbol imm_data 282a, 282b indicate the binary number operand value. The size of imm_data is designated in the instruction as the operand size.

Figure 12:
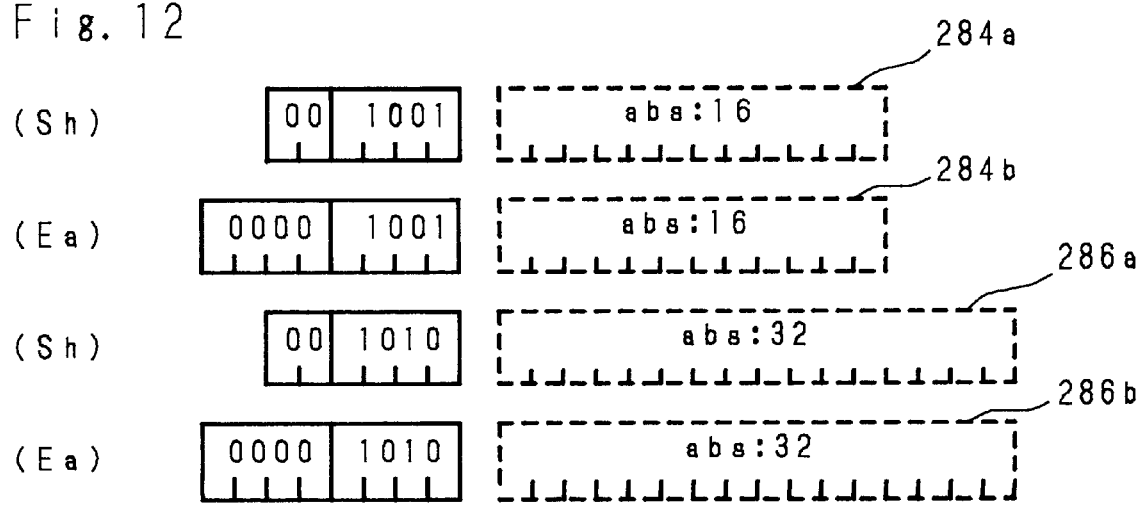
FIG. 12 shows a format for an absolute memory addressing mode instruction.

The absolute mode includes two fields (16 bits and 32 bits) for the address value. Each field takes as an operand the contents of a memory location whose address is a 16-bit or 32-bit pattern designated in the instruction code itself. FIG. 12 is a schematic diagram showing the format thereof. The fields abs:16 284a, 284b and abs:32 286a, 286b represent address values of 16 bits and 32 bits, respectively. When a 16-bit address is used, it is sign-extended to 32 bits.

Figure 13:
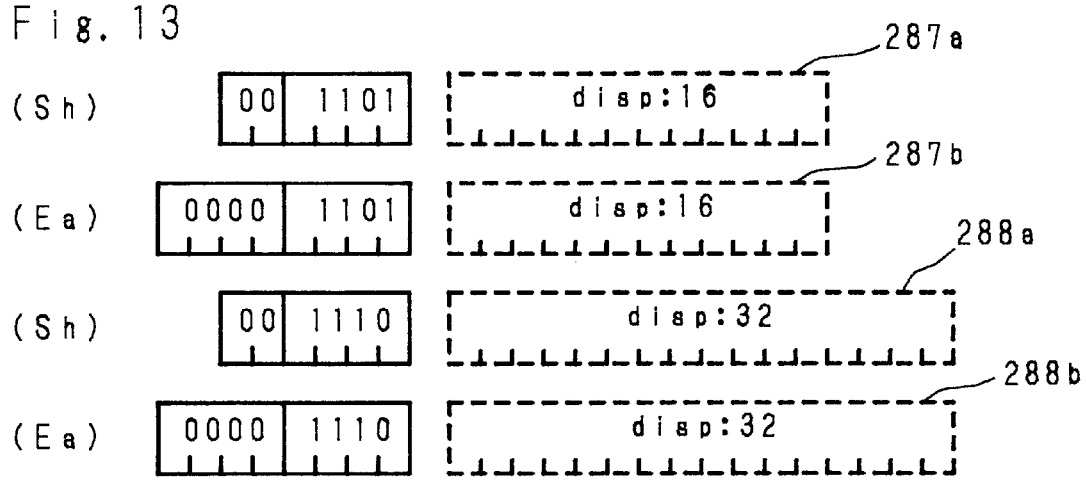
FIG. 13 shows a format for a program counter relative, indirect addressing mode instruction.

The PC relative indirect mode includes two fields (16 bits and 32 bits) for the displacement value. Each takes as an operand the content of the memory location whose address is the value of the contents of a program counter to which a displacement value of 16 bits or 32 bits is added. FIG. 13 is a schematic diagram showing the format thereof. The fields disp:16 287a, 287b and disp:32 288a, 288b represent a displacement value of 16 bits and a displacement value of 32 bits, respectively. The displacement value is treated as a signed binary number. In the PC relative indirect mode, the value of the program counter to which the displacement is added is the starting address of the instruction comprising the operand. Where the value of the program counter is used in the chained addressing mode, the starting address of the instruction is also used as the PC value.

Figure 14:
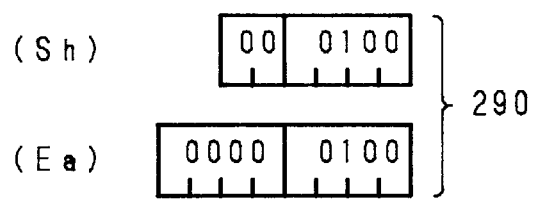
FIG. 14 shows a format for a stack pop addressing mode instruction.

The stack pop mode takes as an operand the contents of the memory location whose address is the contents of a stack pointer (SP). After an operand access, the SP is incremented by the operand's size. For example, where 32-bit data is accessed, the SP is incremented by +4 after the operand access. A stack pop mode for operands of 8 bits, 16 bits or 64 bits are supported, and therein the SP is incremented by +1, +2 or +8, respectively. FIG. 14 is a schematic diagram of the format thereof. When the stack pop mode is invalid for an operand, a reserved instruction exception is generated. Specifically, using the stack pop mode to designate a write operand and a read-modify-write operand causes a reserved instruction exception.

Figure 15:
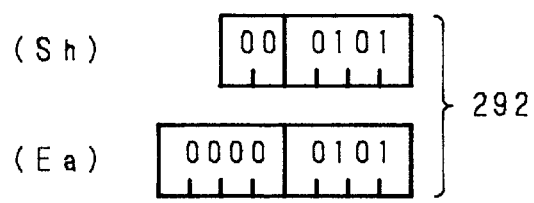
FIG. 15 shows a format for a stack push addressing mode instruction.

The stack push mode takes as an operand the contents of the memory location whose address is the contents of the SP, decremented by the operand size. In the stack push mode, the SP is decremented before the operand is accessed. For example, when accessing 32-bit data, the SP is decremented by −4 before the operand access. It is also possible to designate the stack push mode for operands of 8 bits, 16 bits or 64 bits, wherein the SP is decremented by −1, −2 or −8, respectively. FIG. 15 is a schematic diagram showing the format thereof. When the stack push mode is invalid for the specified operand, a reserved instruction exception is generated. Specifically, a stack push mode designating a read operand and a read-modify-write operand causes a reserved instruction exception.

(2.4.2) Chained Addressing Mode

Addressing, however complicated, can be basically broken down into combinations of addition and indirect references. Accordingly, operations of addition and indirect reference are provided as primitives of addressing, and where they can be combined arbitrarily, arbitrarily complicated addressing modes can be realized. The chained addressing mode of the data processor and the microprocessor of the present invention is an addressing mode based on this concept. A complicated addressing mode is particularly useful for data reference between modules or the processing system of an AI (Artificial Intelligence) language.

When designating the chained addressing mode, in the basic addressing mode designating field, one of three designating methods is selected: a register base chained addressing mode, a PC base chained addressing mode and an absolute chained addressing mode.

Figure 16:
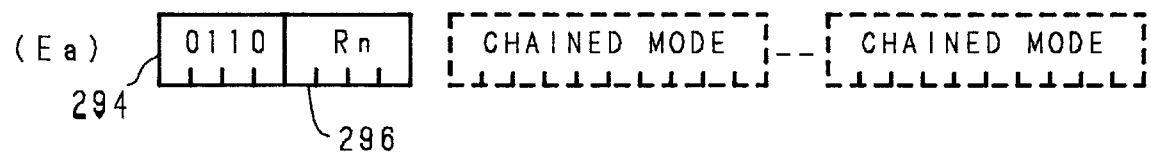
FIG. 16 shows a format for a register base, chained addressing mode instruction.

The register base chained addressing mode is an addressing mode taking the value of the register as the base value of the chained addressing to be extended. FIG. 16 is a schematic diagram showing the format 294 thereof. The field Rn 296 indicates which general-purpose register is used.

Figure 17:
FIG. 17 shows a format for a program counter base, chained addressing mode instruction.

The PC base chained addressing mode is an addressing mode taking the value of the program counter (PC) as the base value of the chained addressing to be extended. FIG. 17 is a schematic diagram showing the format 298 thereof.

Figure 18:
FIG. 18 shows a format for a absolute base, chained addressing mode instruction.

The absolute base chained addressing mode is an addressing mode taking zero as the base value of the chained addressing to be extended. FIG. 18 is a schematic diagram of the format 300 thereof.

Figure 19:
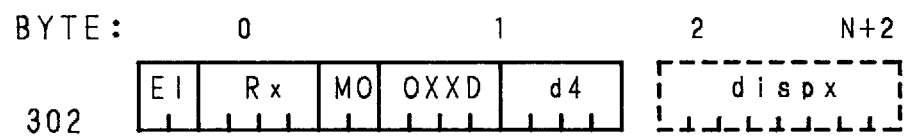
FIG. 19 shows a format for a chained addressing mode instruction.

The chained addressing mode designating the field to be extended takes 16 bits as a unit, and this is repeated any number of times. In each stage of the chained addressing mode, a displacement is added to an operand, an operand is multiplied by a scale factor (X1, X2, X4, X8), an index register value is added to the operand, and/or an indirect reference to memory is done. FIG. 19 is a schematic diagram showing the format 302 of the chained addressing mode. The description of the fields of FIG. 19 are shown below.

| Field | Description of Field |
|---|---|
| E=0 | Continue Chained Addressing Mode |
| E=1 | Address Calculation Ends<br>tmp ==> address of operand |
| I=0 | No memory indirect reference<br>tmp + disp + Rx * Scale ==> tmp |
| I=1 | Memory indirect reference<br>mem [tmp + disp + Rx * Scale] ==> tmp |
| M=0 | Use <Rx> as an index |
| M=1 | Special index<br><Rx>=0 Index value is not added (Rx = 0)<br><Rx>=1 Program counter used as index value (Rx=PC)<br><Rx>=2 or more Reserved |
| D=0 | Quadruple the value of four-bit field d4 in the chained addressing mode and use as an additive displacement value. The d4 field is treated as a signed binary number, and is quadrupled regardless of the size of the operand. |
| D=1 | The field dispx (16/32 bits) designated in the extension part of the chained addressing mode is taken as a displacement value, and the size of the extension field to which this value is added is designated in the d4 field.<br>d4 = 0001 ==> dispx: 16 bits<br>d4 = 0010 ==> dispx: 32 bits |
| XX | Index scale (scale = 1/2/4/8) |

Where scaling of x2, x4, x8 is done on the program counter, an indefinite value is entered as an intermediate value (tmp) after completion of processing for that stage. The effective address obtained by this chained addressing mode becomes an unpredictable value, but no exception is generated. Thus, designation of scaling for the program counter should not be used.

Figure 20:
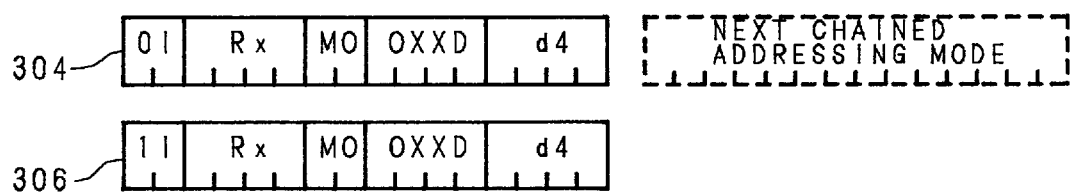
FIG. 20 shows a variation of the format for a chained addressing mode instruction.
Figure 21:
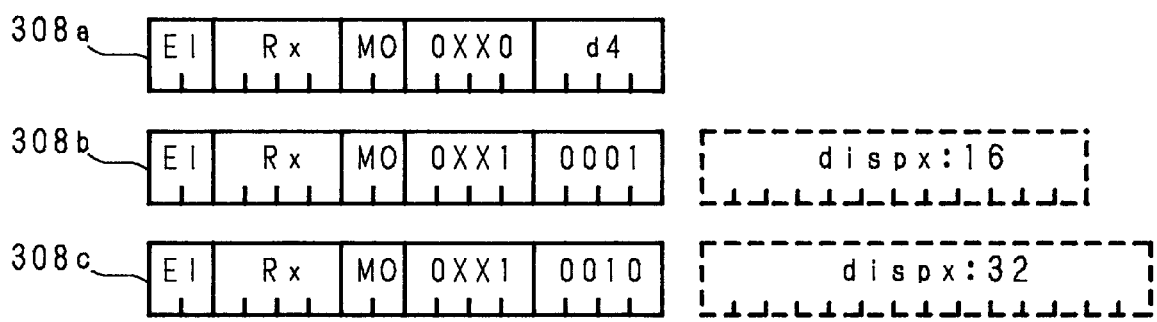
FIG. 21 shows another variation of the format for a chained addressing mode instruction.

FIG. 20 and FIG. 21 show variations of the instruction format formed by the chained addressing mode.

FIG. 20 shows variations of continuation 304 and completion of the chained addressing mode.

FIG. 21 shows variations 308a, 308b, 308c on the size of the displacement value.

When the chained addressing mode involves an arbitrary number (n) of stages, the compiler need not sort based on the number of stages, and the burden on the compiler is thus reduced. This is because, even if the frequency of chained references is very low, the compiler must be able to always generate a correct instruction. For this reason, an arbitrary number of stages call be applied in the format.

(3) Configuration of Function Block Configuration

Figure 22:
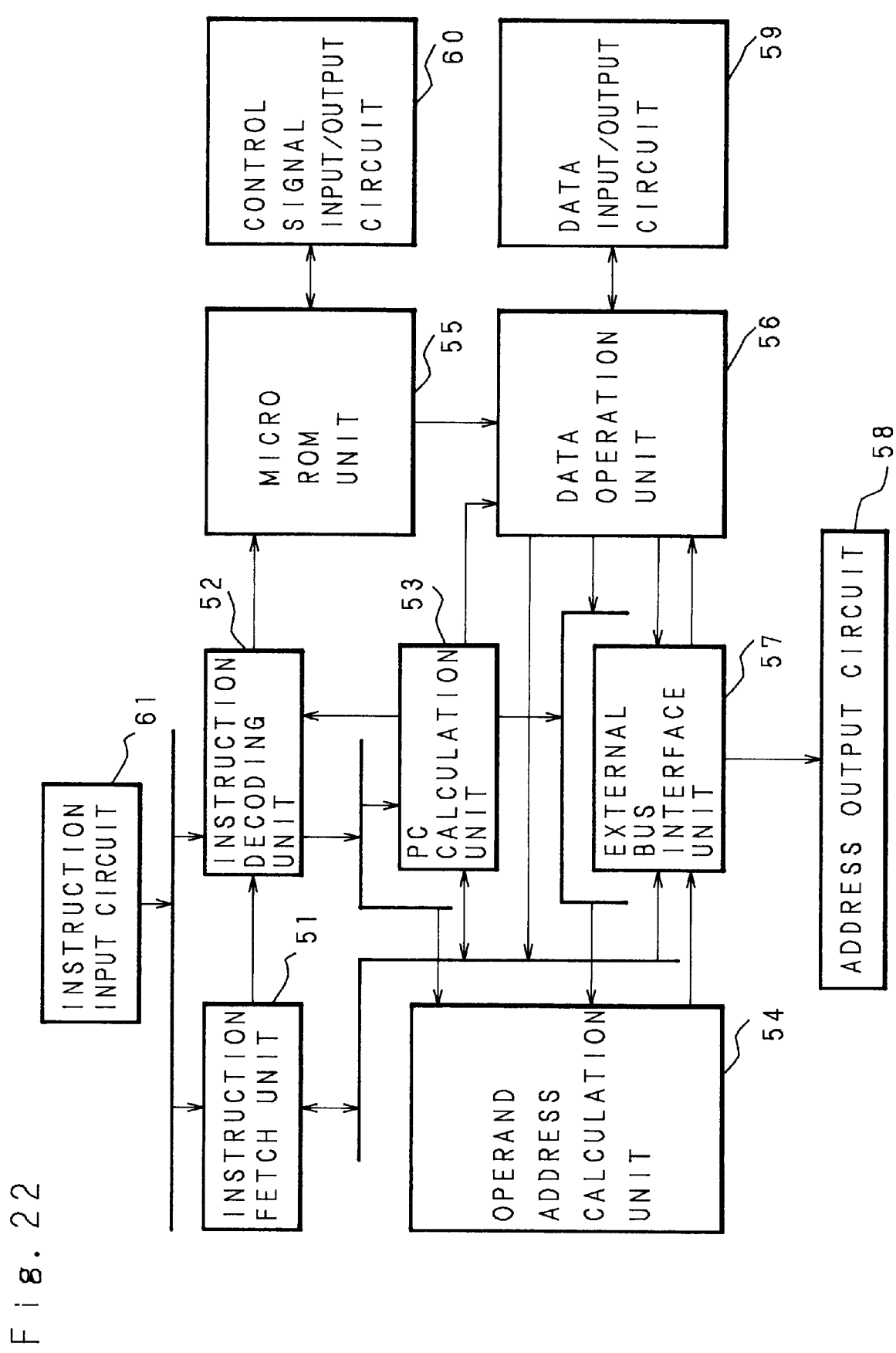
FIG. 22 is a block diagram showing an embodiment of a microprocessor according to the present invention.

FIG. 22 is a block diagram showing an embodiment of CPU 10 as a microprocessor according to the present invention.

Internally, CPU 10 is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 22, in addition to the units described above, an address output circuit 58 for outputting an address to the exterior of a CPU, a data input/output circuit 59 for inputting and outputting data from and to the exterior of the CPU, a control signal input/output circuit 60 connected to the CPU-side control bus 15 and an instruction input circuit 61 connected to the instruction bus 16 for inputting instruction codes are shown being separated from the other function block units.

(3.1) Instruction Fetch Unit

The instruction fetch unit 51, which comprises a built-in instruction cache, an instruction queue and a controlling unit thereof, determines the address of an instruction to be fetched next and fetches the instruction from the built-in instruction cache or main memory 13, which are outside the CPU. It also effects instruction registering to the built-in instruction cache.

The address of the instruction to be fetched next is calculated by a dedicated counter as the address of the instruction to be inputted to an instruction queue. When a branch or jump is generated, the address of a new instruction is transferred from the PC calculation unit 53 or the data operation unit 56.

In the case where an instruction is fetched from the instruction queue 11 or main memory 13 outside the CPU, the address of the instruction to be fetched is output from address output circuit 58 to the outside of the CPU through external bus interface unit 57, and an instruction code is fetched from instruction input circuit 61.

Then, among the instruction codes in buffering, the next instruction code to be decoded is output to the instruction decoding unit 52.

(3.2) Instruction Decoding Unit

In instruction decoding unit 52, an instruction code is decoded on a 16-bit (half word) basis. This block comprises a FHW decoder for decoding an operation code included in the first half word, a NFHW (not first half word) decoder for decoding an operation code included in the second and the third half words, and an addressing mode decoder for decoding an addressing mode. The FHW decoder, NFHW decoder and addressing mode decoder are generally called the first stage decoder.

There is also a second stage decoder which further decodes an output of the FHW decoder and the NFHW decoder and calculates an entry address to the micro ROM, a branch predicting mechanism for performing branch prediction of a conditional branch instruction, and an address calculation conflict checking mechanism for checking pipeline conflicts in calculating an operand address.

Instruction decoding unit 52 decodes the instruction code being input from instruction fetch unit 51, at a rate of zero to 6 bytes per clock cycle. As a result of decoding, information about operations in data operation unit 56 is output to micro ROM unit 55, information about operand address calculations is output to operand address calculation unit 54, and information about PC calculations is output to PC calculation unit 53.

(3.3) Micro ROM Unit

Micro ROM unit 55 comprises a micro ROM for storing microprograms and mainly controls data operation unit 56, a micro sequencer, and a micro instruction decoder. One micro instruction is read out from micro ROM 55 per clock cycle. The micro sequencer handles exception, interruption and trap processings (these three are generally called EIT) in a hardware manner, in addition to the sequential processing the microprogram code. Micro ROM unit 55 also controls a store buffer.

Micro ROM unit 55 receives flag information generated by interrupts independent of the instruction code or operation execution, and the output of an instruction decoding unit such as the output of a second stage decoder.

Output of the micro decoder is provided mainly to data operation unit 56, but some information, such as the interruption of pipeline processing due to the execution of a jump instruction is output to other blocks.

(3.4) Operand Address Calculation Unit

Operand address calculation unit 54 is controlled in a hardwired manner by operand address calculations output from the addressing mode decoder of instruction decoding unit 52 or the like. Substantially all processing of operand address calculations is performed. In operand address calculation unit 54 checks are made to determine whether or not the memory access address for memory indirect addressing and the operand address are within an I/O area mapped in the memory.

The address calculation result is sent to external bus interface unit 57. The values of the general-purpose register and the program counter required for address calculation are input from data operation unit 56 or PC calculation unit 53.

For memory indirect addressing, the referenced memory address is output from address output circuit 58 to the outside of the CPU through external bus interface unit 57, and the indirect address value input from data input/output unit 59 is fetched through instruction decoding unit 52.

(3.5) PC Calculation Unit

PC calculation unit 53 is controlled in a hardwired manner using PC calculation data output from instruction decoding unit 52. PC calculation unit 53 calculates the PC value of an instruction. The microprocessor of the present invention has a variable-length instruction set, and the length of an instruction can be found only after the instruction is decoded. For this reason, PC calculation unit 53 generates the PC value of the next instruction by adding the length of the instruction output from instruction decoding unit 52 to the PC value of the instruction being decoded.

The calculation result from PC calculation unit 53 is output as the PC value of each instruction together with the instruction decoding result.

(3.6) Data Operation Unit

Data operation unit 56 is controlled by microprograms, and executes operations using registers and an arithmetic unit according to information output by micro ROM unit 55.

When the operand to be operated by an instruction is an address or an immediate value, the address or the immediate value calculated in operand address calculation unit 54 is obtained by passing it through external bus interface unit 57 to data operation unit 56.

When the operand is in memory outside the CPU, the external bus interface unit 57 outputs the address calculated in address calculation unit 54 from address output circuit 58, and the operand fetched from the memory outside the CPU is obtained through data input/output circuit 59.

When access to memory outside the CPU is required for a data operation, the address is output from address output circuit 58 to the outside of the CPU through external bus interface unit 57 under the control of the microprogram, and the target data is fetched through data input/output circuit 59.

When data is stored in memory outside the CPU, the address is output from address output circuit 58 through external bus interface unit 57, and simultaneously, the data is output from data input/output circuit 59 to the outside of the CPU. In order to efficiently perform an operand store, a four-byte store buffer is installed in data operation unit 56.

When data operation unit 56 obtains a new instruction address by processing a jump instruction or exception processing, the address is output to instruction fetch unit 51 and PC calculation unit 53.

(3.7) External Bus Interface Unit

External bus interface unit 57 controls communication through the external bus of the microprocessor of the present invention. Every access to memory is performed in a clock-synchronized manner, and can be performed in a minimum of two clock cycles.

External bus interface unit 57 is provided with a built-in data cache. When read-out of an operand hits the built-in data cache, a memory access is not executed. Write-in of an operand is executed with respect to both the built-in data cache and the outside memory. When the coprocessor writes an operand into memory, the operand is read in through data input/output circuit 58 and then any corresponding address in the built-in data cache is updated.

Bus access requests to outside memory are generated independently from instruction fetch unit 51, operand address calculation unit 54 and data operation unit 56. External bus interface unit 57 arbitrates these memory access requests. Furthermore, access to data located at misaligned words, i.e., memory addresses which are not on even 64-bit word boundaries (double words), which is the size of the data bus connecting data cache 12 to CPU 10, are executed so that the misalignment is automatically detected and the memory access is broken down into two memory accesses.

Unit 57 also caries out conflict-preventing processing and by-pass processing from the store operand to the fetch operand when the operand to be prefetched and the operand to be stored are superimposed.

(4) Pipeline Processing

CPU 10 achieves high performance by pipeline processing instructions using instruction bus 16 and data bus 17 efficiently. Next, the pipeline processing method of the CPU 10 is described.

(4.1) Pipeline Processing Mechanism

Figure 23:
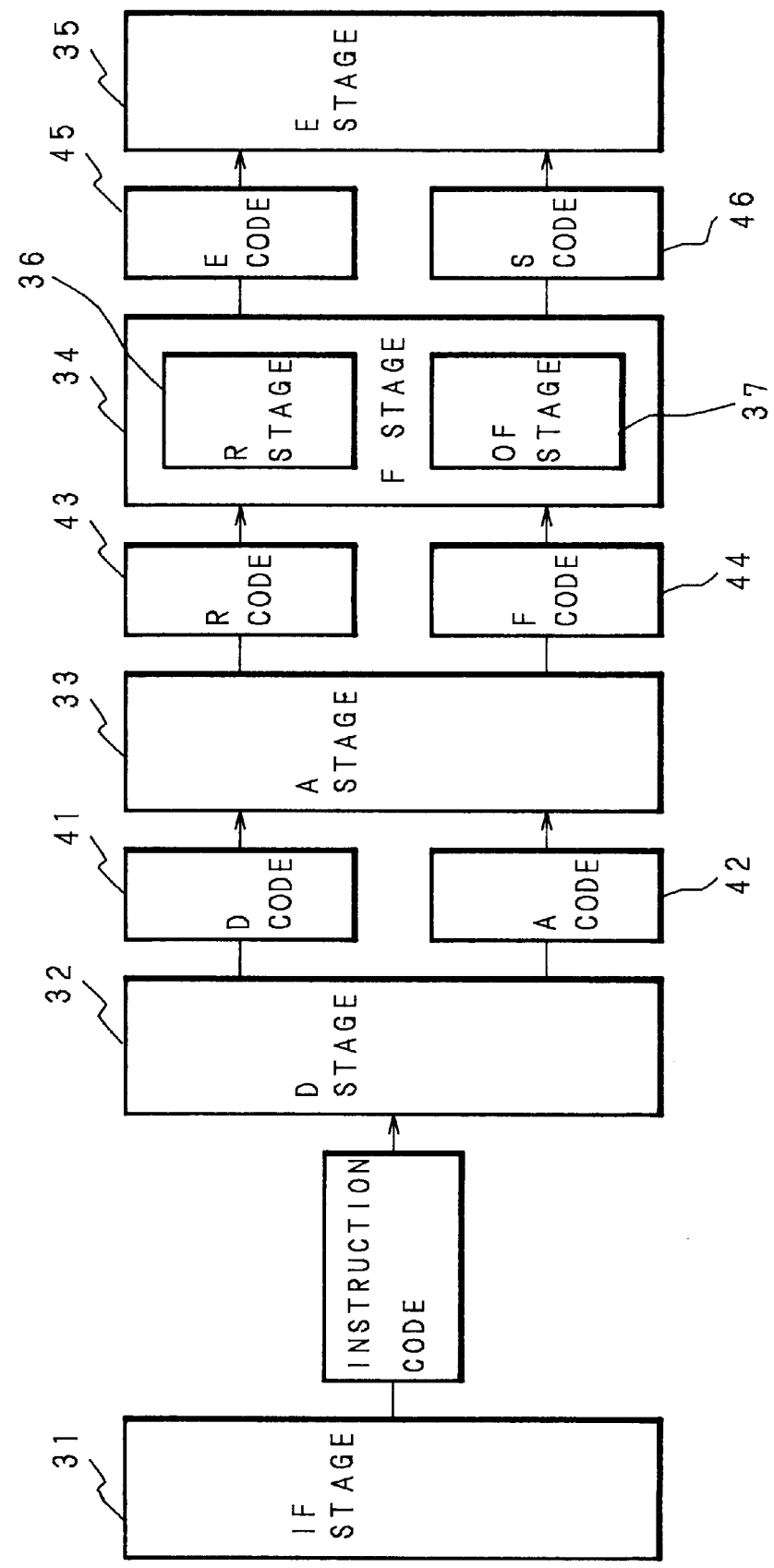
FIG. 23 is a schematic diagram showing a pipeline processing mechanism according to the present invention.

FIG. 23 is a schematic diagram showing a pipeline processing mechanism of the data processor of the present invention.

Pipeline processing is based on a five-stage model that comprises an instruction fetch stage (IF stage) 31 for prefetching instructions, a decoding stage (D stage) 32 for decoding the instructions, an operand address calculation stage (A stage) 33 for calculating the address of an operand, an operand fetch stage (F stage) 34 consisting of a portion for micro ROM access (R stage 36) and a portion for prefetch of an operand (an OF stage 37), and an execution stage (E stage) 35 for executing an instruction.

The E stage 35 comprises a one-stage store buffer. For some high-function instructions, the execution of an instruction itself is performed in a pipeline manner, and pipeline processing of five or more stages is thus obtainable.

Each stage operates independently from the other stages, and, theoretically, the five stages operate independently. Each stage can perform one-time processing in a minimum of one clock cycle. Accordingly, the pipeline processing progresses after each clock cycle.

The data processor of the present invention comprises some instructions that need to be processed beyond the basic one-time pipeline processing of the CPU 10, such as all operation between memory and memory or memory indirect addressing, but the data processor of the present invention is designed so that balanced pipeline processing can be performed whenever possible for processing these instructions. For an instruction having a plurality of memory operands, pipeline processing is performed based on the number of memory operands by separating the instruction into a plurality of pipeline processing units (step codes) at the decoding stage.

A detailed description of the method for separating instructions into multiple step codes in the pipeline processing unit is disclosed in Japanese Patent Application Laid-Open No. 63-89932 (1988) (incorporated herein by reference).

The information transferred from IF stage 31 to D stage 32 is an instruction code.

Information transferred from D stage 32 to A stage 33 includes two kinds of information, one kind indicating an operation designated by an instruction (D code 41) and the other kind indicating an address calculation of an operand (A code 42).

Information transferred from A stage 33 to F stage 34 includes an R code 43 comprising an entry address and a parameter of a microprogram and an F code 44 comprising an operand address and information for memory access.

Information transferred from F stage 34 to E stage 35 is an E code 45 comprising operation control information and a literal and an S code 46 comprising an operand and its operand address.

An EIT detected in a stage other than E stage 35 does not initiate EIT processing until the code thereof reaches E stage 35. This is because the instruction is ready for execution only when it has been processed in E stage 35, and instructions processed between IF stage 31 and F stage 34 have not yet reached the execution step. Accordingly, when an EIT is detected in a stage other than E stage 35, the detection thereof is recorded in the step code and is transmitted only to the following stage.

(4.2) Processing of each Pipeline Stage

In FIG. 23, as a convenience, names have been given to the input and output step codes of each pipeline stage. The step codes perform processes related to operation codes and include two series: a series for indicating entry addresses of microprograms and parameters for E stage 35, and a series for indicating the operands for microinstructions of E stage 35.

(4.2.1) Instruction Fetch Stage

Instruction fetch stage (IF stage) 31 fetches an instruction from its internal instruction cache or from the external instruction cache 11, inputs the instruction into the instruction queue, and outputs an instruction code to D stage 32.

Input of the instruction queue is performed on aligned four-byte units. When an instruction is fetched from the external instruction cache 11, a minimum of two clock cycles are required to read the aligned four bytes. With the internal instruction cache, four aligned bytes can be fetched in one clock cycle. The output unit of the instruction queue outputs a multiple of two bytes, and a maximum of six bytes can be output during one clock. Immediately after a branch, two bytes of the instruction base field can also be transferred directly to the instruction decoder by by-passing the instruction queue.

Control of registering and clearing of the instruction to the internal instruction cache, management of instruction addresses to be prefetched and control of the instruction queue are also carried out in IF stage 31.

(4.2.2) Instruction Decoding Stage

Instruction decoding stage (D stage) 32 decodes an code input from IF stage 31. Decoding is done on a one-clock-cycle basis using the first stage decoder consisting of the FHW decoder, the NFHW decoder and the addressing mode decoder in instruction decoding unit 52. An instruction code of 0 to 6 bytes is consumed in the decoding processing during one operation (no instruction code is consumed in output of the step code comprising the return address of the RET instruction). A single operation of the decoding unit inputs to A stage 33, a control code of about 35 bits (the A code 42 as address calculation information), address modification information of a maximum 32 bits, a control code of about 50 bits (the D code 41, which results from intermediate decoding of the operation code), and literal information of 8 bits.

In D stage 32, control of PC calculation unit 53 of each instruction, and output processing of the instruction code from the instruction queue are also performed.

(4.2.3) Operand Address Calculation Stage

Processing functions of operand address calculation stage (A stage) 33 are roughly divided into two parts. One is processing for post-decoding of the operation code using the second stage decoder of instruction decoding unit 52, and the other is for calculation of an operand address in operand address calculation unit 54.

The post-decoding processing of the operation code inputs the D code 41 and outputs the R code 43 comprising write reservation of the register and memory, an entry address of a microprogram and parameters for the microprogram. In addition, the write reservation of the register or memory prevents incorrect address calculation by re-writing the contents of the register or memory referenced by the address calculation of an instruction, where a previously pipelined instruction has changed its value.

Operand address calculation processing inputs the A code 42, performs addition in the operand address calculation unit 54 according to the A code 42 or performs address calculation by combining a memory indirect reference, and outputs the result of the calculation as the F code 44. At this time, a conflict check is made by reading out the register and memory accompanying the address calculation. When a conflict is indicated because the preceding instruction has not completed writing to the register or the memory, the processing waits until the preceding instruction completes the write process in E stage 35.

(4.2.4) Micro ROM Access Stage

Processing in operand fetch stage (F stage) 34 is divided roughly into two parts: access processing of the micro ROM, (R stage 36), and operand prefetch processing, (OF stage 37). R stage 36 and OF stage 37, which do not necessarily operate at the same time, operate independently depending on whether or not the memory access right can be acquired.

Micro ROM access processing, which is the processing of R stage 36, comprises micro ROM access and micro instruction decoding processing for generating the E code 45, which is an execute control code used in the following E stage 35 for the R code 43. When processing for one R code 43 is separated into two or more microprogram steps, the micro ROM is used in E stage 35 and the following R code 43 waits for a micro ROM access. Micro ROM access using the R code 43 occurs when the last micro instruction is executed in the preceding E stage 35. In CPU 10, almost all of the basic instructions are executed in one microprogram step; therefore, there are many cases in which the micro ROM accesses to the R code 43 occur one after another.

(4.2.5) Operand Fetch Stage

Operand fetch stage (OF stage) 37 executes operand prefetch processing between the two above-mentioned processes of F stage 34.

Pre-fetch of an operand is executed from the internal data cache or data cache 12.

Operand prefetch processing inputs the F code 44 and outputs the fetched operand and the address thereof as the S code 46. One F code 44 may exceed the double word size limit, but designates operand fetching of four bytes or less. The F code 44 also determines whether access to the operand is to be performed. When the operand address, itself, calculated in A stage 33 or the immediate value, is transferred to E stage 35, no operand prefetch is performed and the F code 44 is transferred as the S code 46. When the operand intended to be prefetched coincides with the operand intended to be write-processed in E stage 35, no operand prefetching is performed from memory, but operation of the prefetch is performed by by-passing it.

(4.2.6) Execution Stage

The execution stage (E stage) 35 operates with the E code 45 and the S code 46 taken as inputs. E stage 35 executes instructions, and all processes performed in preceding stages and in F stage 34 are preprocesses for E stage 35. When a jump instruction is executed in E stage 35 or EIT process is started, all the processes from IF stage 31 to F stage 34 are disabled. E stage 35 is controlled by microprograms, and an instruction is executed by executing a series of microprograms starting with the entry address of the microprogram indicated by R code 43.

Reading the micro ROM and execution of microinstructions are performed in a pipeline manner. Accordingly, when a branch occurs in the microprogram, a gap (blank) of one microstep is generated. E stage 35 can also perform pipeline processing of an operand store of four bytes or less and execute the following microinstruction by utilizing the store buffer in data operation unit 56.

In E stage 35, the write reservation for the register and the memory performed in A stage 33 is released after the operand is written.

Various interrupts are accepted in E stage 35 at a pause in the instructions, and necessary processes are executed by microprograms. Processing of other EITs is performed by microprograms.

(4.3) Status Control of each Pipeline Stage

Each stage of the pipeline has an input latch and an output latch, and operates independent of other stages. Each stage initiates a following process step after the current process completes and the result of the current process has been transferred from the output latch of that stage to the input latch of the next stage and all input signals required for the following process have been prepared in the input latch of the next stage.

This means that each stage starts a processing cycle after all the input signals for the next processing cycle are output from the immediately preceding stage, the result of the current processing cycle is transferred to the input latch of the immediately following stage, and the output latch of the current stage becomes empty.

In other words, for each stage, all input signals must be ready one clock cycle before processing starts within the stage. If the input signals are not all ready, the stage is put into a waiting state (input waiting). Before transferring data from the output latch of one stage to the input latch of the next stage, the input latch of the next stage must be empty, or the one stage will be put into an additional waiting state (output waiting). If the required memory access right cannot be acquired, or a wait is inserted into the memory access, or another pipeline conflict occurs, the process is delayed within the stage.

(5) Bus Accessing Operation (5.1) Input and Output Signal Lines

Figure 24:
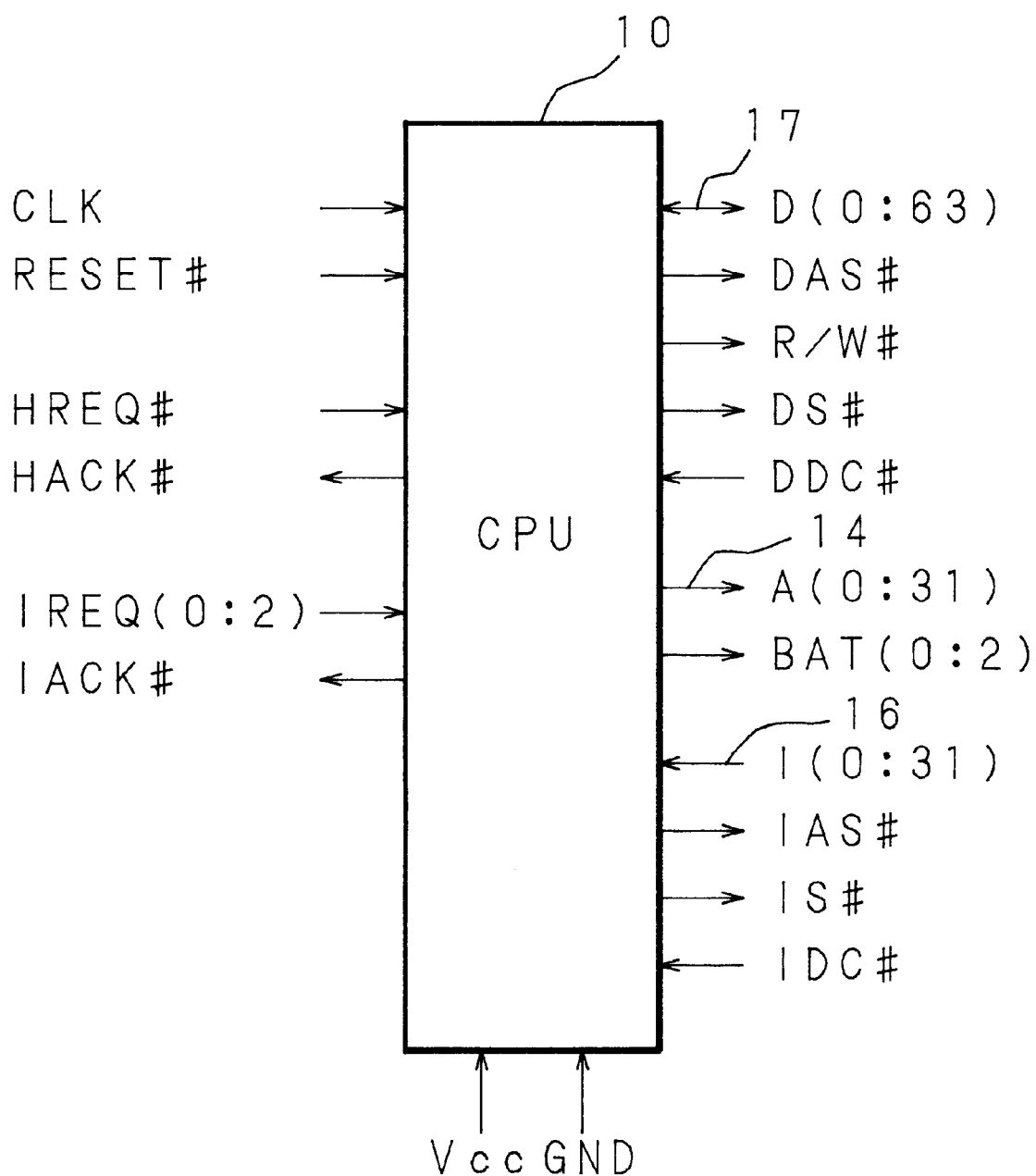
FIG. 24 is a schematic diagram showing the input/output signals of the microprocessor according to the present invention.

FIG. 24 is a schematic diagram showing input and output signals of CPU 10.

CPU 10 inputs and outputs various control signals over the CPU-side control bus 15 in addition to a power source Vcc, a ground GND, the 64-bit data bus D(0:63) 17, the 32-bit address bus A(0:31) 14, the 32-bit instruction bus I(0:31) 16, and an input clock CLK.

The CLK line is for an externally input clock, which has a frequency double that of the operation clock of the CPU 10.

Data address strobe DAS# is a data address valid signal which is low when the data address output on address bus 14 is valid.

Read/write R/W# is a signal that distinguishes whether the bus cycle of data bus 17 is a data input to CPU cycle or a data output from CPU cycle.

Data strobe DS# is a signal which is low when CPU 10 is ready for data input or has output data on the data bus 17.

DDC# is a data transfer end signal that informs CPU 10 that it may end the data access cycle.

The lines BAT(0:2) indicate the type of access being sought by CPU 10. FIG. 25 shows the meanings of various values BAT(0:2), and their relation to address bus 14, instruction bus 16 and data bus 17.

Instruction Address Strobe IAS# is an instruction address valid signal which is low when the instruction address output on address bus 14 is valid.

Instruction Strobe IS# is a signal which is low when CPU 10 is ready for instruction input.

IDC# is an instruction transfer end signal which informs CPU 10 that it may end the instruction access cycle.

The Hold Request (HREQ#) line is used to request bus control from CPU 10. The HACK# line is used to signal the relinquishing of the bus by CPU 10 to another device.

The IREQ(0:2) lines are used for sending an interrupt request signal to CPU 10.

The IACK# line is used for CPU 10 to signal that CPU 10 is executing an interrupt vector access cycle after receiving an interrupt request.

Figure 26:
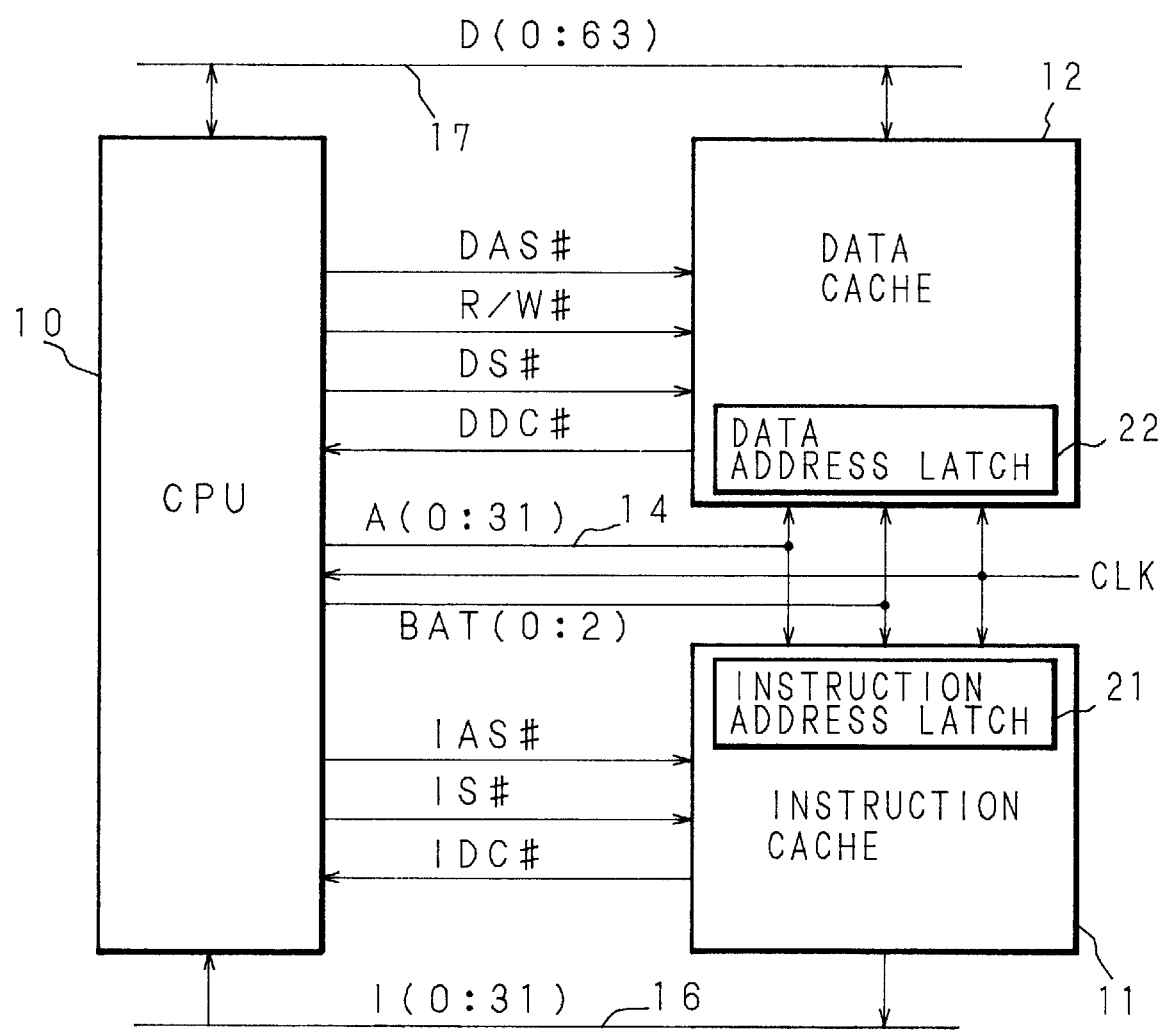
FIG. 26 is a schematic diagram showing the signal connections in a data processor according to the present invention.

FIG. 26 is a schematic diagram showing connections CPU 10, data cache 12 and instruction cache 11.

CPU 10 is coupled to data cache 12 via BAT(0:2), DAS#, R/W#, DS# and DDC# in addition to data bus 17 and address bus 14.

CPU 10 is coupled to instruction cache 11 via BAT(0:2), IAS#, IS# and IDC# in addition to instruction bus 16 and address bus 14.

The clock CLK is supplied to all three devices 10, 11 and 12, and determines the basic timing of the system.

Figure 27:
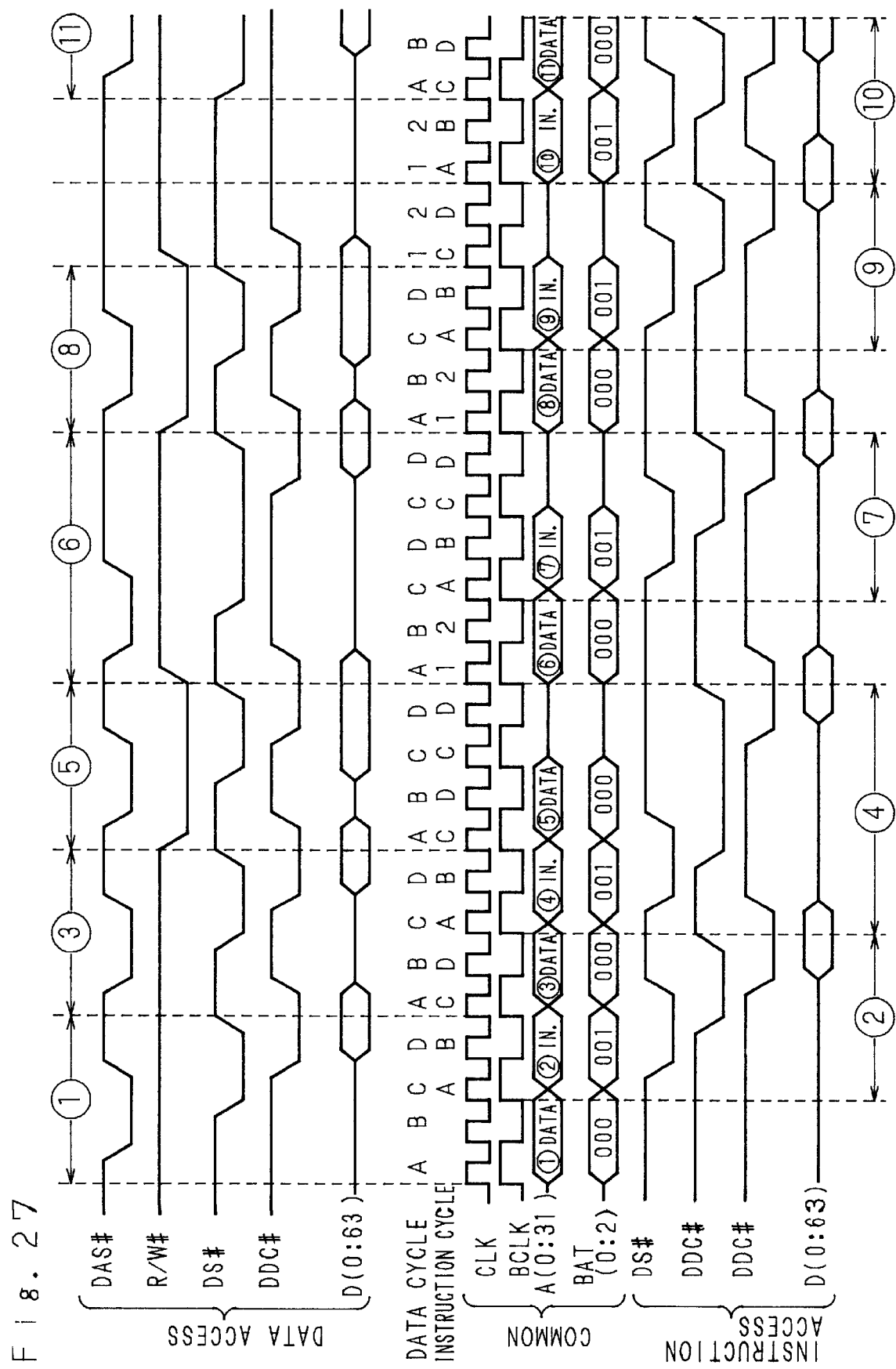
FIG. 27 is a timing chart showing the timing of bus access operations of a microprocessor according to the present invention.

FIG. 27 is a timing chart showing states of operation of address bus 14, instruction bus 16, data bus 17 and various control signals. Active-low signals are indicated with a "#" affixed to their names.

Data bus 17 and instruction bus 16 operate with the caches and memory at speeds high enough to allow an access once every four cycles of the double frequency clock on the CLK line.

Two cycles of the CLK clock are equivalent to one clock cycle of the CPU's internal clock. BCLK designates a signal which indicates whether a clock pulse is an odd-numbered or an even-numbered pulse. The relationship between the CLK pulses and the BCLK pulses is determined upon system reset.

Address bus A(0:31) 14 is used for access to data cache 12 and access to instruction cache 11. When CPU 10 outputs values on address bus A(0:31) and the BAT(0:2) lines, the values are valid for two cycles of CLK from that time. Thereafter, the values are varied. For this reason, data cache 12 is provided with a data address latch 22 for holding the input data address until the data access is complete. Also, instruction cache 11 is provided with an instruction address latch 21 for holding the input instruction address until the instruction access is complete.

During four clock cycles of CLK, the data address and the instruction address are output from the address bus 14 in a time-shared fashion. In other words, on address bus A(0:31) 14, one data address and one instruction address can be output every four clock cycles of CLK.

FIG. 27 shows a data read cycle with zero wait (C1), an instruction read cycle with zero wait (C2), a data read cycle with zero wait (C3), an instruction read cycle with one wait state (C4), a data write cycle with zero wait (C5), a data read cycle with one wait state (C6), an instruction read cycle with zero wait (C7), a data write cycle with zero with (C8), an instruction read cycle with zero wait (C9) and an instruction read cycle with zero wait (C10), as well as the initial portion of the next data read cycle.

A data access cycle and an instruction access cycle can be overlapped by two clock cycles of CLK, as, for example, in the case of (C1) and (C2) or the case of (C8) and (C9). However, two data access cycles or two instruction access cycles cannot be executed in an overlapped fashion, for example, in the case of (C5) and (C6) or (C9) and (C10).

A succeeding data access cycle is started when the preceding data access cycle is complete. Specifically, a data address is output by CPU 10 onto address bus A(0:31) 14 synchronically with a rise in BCLK when BAT(0:2) is 000. DDC# is then asserted, thus completing the bus cycle.

In a data access cycle, the data address strobe DAS# is asserted with a delay of a half cycle of the CLK clock relative to the address output. Also, the data strobe DS# is asserted with a delay of one and a half cycles of CLK.

A read cycle and a write cycle are distinguished from each other by the read/write R/W# signal.

In a data write cycle, data is output to data bus 17 with a delay of one and a half cycles of CLK relative to the address output.

In a data read cycle, when the DDC# signal is asserted, the value on data bus 17 at the falling edge of CLK is read by CPU 10.

Where the preceding instruction access cycle is complete, the instruction access cycle starts when the address from the data access cycle is no longer output. Specifically, the instruction address is output to address bus 14 synchronically with a rising edge of BCLK when BAT(0:2) is 001. IDC# is then asserted, thus completing the bus cycle.

In an instruction access cycle, the instruction address strobe IAS# is asserted with a delay of a half cycle of CLK with respect to the output of an instruction address. The instruction strobe IS# is asserted one and a half cycles of CLK after the address output. Then, when the IDC# is asserted, the value on the instruction bus 16 at the falling edge of CLK is read by CPU 10. Where a data access cycle and an instruction access cycle are needed at the same time, the data access cycle, which has priority, is started first.

In the data access cycle and the instruction access cycle, the access time is extended by an integer number of clock cycles of BCLK until DDC# and IDC# are respectively asserted.

In CPU 10, where HREQ# has been asserted, after both the data access cycle and the instruction access cycle being executed at that time have completed, the HACK# signal is asserted and CPU 10 gives the right of bus master to another device. When HREQ# is deasserted, HACK# is deasserted and CPU 10 takes back the right of bus master.

(6) Another Embodiment of the Present Invention

In the embodiment described above, the signal BAT(0:2) determines whether the value on address bus 14 is a data address or an instruction address by distinguishing the kind of access cycle involved. When the BAT(0:2) signal is not used, the access type can be made only by checking which signal of DAS# and IAS# has been asserted.

In the embodiment described above, the validity of the data address output onto address bus 14 is shown by the DAS# signal, and the validity of the instruction address output onto address bus 14 is shown by the IAS# signal. However, the type of address output to address bus 14 can be determined from the BAT(0:2) signals; consequently, an alternate embodiment is possible wherein an address valid signal obtained from an inclusive operation of the signal DAS# and the signal IAS# is output in place of separately outputting the signal DAS# and the signal IAS#.

Furthermore, in the embodiment described above, the description is based on the data processor and the microprocessor of the present invention always accessing instructions and data using the novel bus protocol, but an embodiment may be adopted wherein the bus protocol of a conventional data processing system executes an instruction access and a data access without overlapping in one mode and the novel bus protocol can be used in an alternate mode.

In addition, in the embodiment described above, the description is based on a 64-bit data bus, but the width of the data bus may be 32 bits like the width of the instruction bus, or another bit width may be used.

Also, in the embodiment described above, no reference is made to an embodiment where a coprocessor is connected to CPU 10, but in the data processor and the microprocessor of the present invention it is possible for commands and data to be given and received between CPU 10 and the coprocessor, using address bus 14 and data bus 17 and setting the value of BAT(0:2) to "100" or "101.

As described above in detail, the data processor and the microprocessor of the present invention are provided with an address bus, a data bus, and an instruction bus, and transfer data addresses and instruction addresses on the address bus at high speeds. Also, the signal controlling data access and the signal controlling the instruction access are independent from each other; consequently, a data access cycle and an instruction access cycle can be executed in an overlapped manner. In this case, one address bus does work equivalent to two address buses consisting of a data address bus and an instruction address bus, and data access and instruction access capabilities are high.

Also, the address bus outputs the data address and the instruction address while switching between the two at high speed, but the switching is made between one output mode and another output mode from the CPU which is much easier to design circuits for than a high speed bus switching between inputs and outputs, as is the case with a conventional data processor or microprocessor multiplexing addresses and data on a bus or multiplexing address and instructions on a bus. Problems caused by the switching between input and output, such as the problem of high-speed direction changes in a TTL transceiver, are avoided in the present invention.

The data cache inputs, for example, a data address from the address bus into the data address latch when DAS# is low, and the instruction cache inputs, for example, an instruction address to the instruction address latch when IAS# is low. In this case, a system can be configured so that independent address buses are provided for instructions and data, except that the validity period of address values on the address bus is shortened. This means that the data processor and the microprocessor of the present invention does the work of two address buses using only one address bus while maintaining a level of system design comparable to conventional data processors.

As mentioned above, the data processor and the microprocessor of the present invention make it possible to produce a low-cost, high-performance system that efficiently transfers data and instructions by using a novel bus protocol.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An apparatus for data processing, comprising:

a data memory, having a data address input;

an instruction memory, having an instruction address input;

a processor, having an address output, said processor overlapping first and second access cycles, said first and second access cycles being either a data access followed by an instruction access or an instruction access followed by a data access;

means for data and instruction access which reads data from or writes data to said data memory during a data access cycle and which reads instructions from said instruction memory during an instruction access cycle;

an address bus coupling said address output of said processor to said data address input of said data memory and said instruction address input of said instruction memory;

a data bus coupling said processor and said data memory, whereby data are carried between said processor and said data memory;

an instruction bus coupling said processor and said instruction memory, whereby instructions are carried from said instruction memory to said processor;

a control bus coupling said processor, said data memory, and said instruction memory, said control bus comprising a plurality of control signals, said control signals comprising at least:

an access type signal from said processor to said data memory or said instruction memory, said access type signal indicating which of a data access and an instruction access is being requested by said processor;

a data transfer end signal from said data memory to said processor, said data transfer end signal indicating the completion of a data transfer over said data bus; and an instruction transfer end signal from said instruction memory to said processor, said instruction transfer end signal indicating the completion of an instruction transfer over said instruction bus;

means for controlling data and instruction access, whereby said processor overlaps said first and second access cycles and completes said second access cycle before said first access cycle is complete, said processor, during said first access cycle, always releasing said address bus before said first access cycle completes, a data address latch, coupled to said data address input for latching contents of said address bus while a valid data address is present on said address bus and until said data memory completes an access of a data memory location addressed by said contents of said address bus; and an instruction address latch, coupled to said instruction address input for latching contents of said address bus while a valid instruction address is present on said address bus and until said instruction memory completes an access of an instruction memory location addressed by said contents of said address bus.

2. The apparatus of claim 1, wherein said control signals further comprise a data read/write signal from said processor to said data memory, said data read/write signal indicating which type of data access is being requested by said processor, a transfer of data from said processor to said data memory or a transfer of data to said processor from said data memory.

3. The apparatus of claim 1, wherein said control signals further comprise a data ready signal from said processor to said data memory, said data ready signal indicating when said processor is ready to transfer data from said data memory to said processor and when said processor is ready to transfer data from said processor to said data memory.

4. The apparatus of claim 1, wherein said control signal include an instruction ready signal from said processor to said instruction memory, said instruction ready signal indicating when said processor is ready to transfer an instruction from said instruction memory to said processor.

5. The apparatus of claim 1, wherein said control signals include a data address valid signal from said processor to said data memory, said data address valid signal indicating a valid data address on said address bus and an instruction address valid signal from said processor to said instruction memory, said instruction address valid signal indicating a valid instruction address on said address bus.

6. The apparatus of claim 5, wherein said address valid signal and said instruction address valid signal indicate which of a data access and an instruction access is being requested by said processor.

7. An apparatus for data processing, comprising:

a data memory, having a data address input;

an instruction memory, having an instruction address input;

a processor, having an address output, said processor overlapping first and second access cycles, said first and second access cycles being either a data access followed by an instruction access or an instruction access followed by a data access;

means for data and instruction access which reads data from or writes data to said data memory during a data access cycle and which reads instructions from said instruction memory during an instruction access cycle;

an address bus coupling said address output of said processor to said data address input of said data memory and said instruction address input of said instruction memory;

a data bus coupling said processor and said data memory, whereby data are carried between said processor and said data memory;

an instruction bus coupling said processor and said instruction memory, whereby instructions are carried from said instruction memory to said processor;

a control bus coupling said processor, said data memory, and said instruction memory comprising a plurality of control signals, said control signals comprising at least:

an access type signal from said processor to said data memory or said instruction memory, said access type signal indicating which of a data access and an instruction access is being requested by said processor;

a data transfer end signal from said data memory to said processor, said data transfer end signal indicating the completion of a data transfer over said data bus; and an instruction transfer end signal from said instruction memory to said processor, said instruction transfer end signal indicating the completion of an instruction transfer over said instruction bus;

means for controlling data and instruction access, whereby said processor overlaps said first and second access cycles and completes said second access cycle before said first access cycle is complete, said first and second access cycles being either a single data word access followed by a single instruction word access or a single instruction word access followed by a single data word access;

a data address latch, coupled to said data address input for latching contents of said address bus while a valid data address is present on said address bus and until said data memory completes an access of a data memory location addressed by said contents of said address bus; and an instruction address latch, coupled to said instruction address input for latching contents of said address bus while a valid instruction address is present on said address bus and until said instruction memory completes an access of an instruction memory location addressed by said contents of said address bus.

8. The apparatus of claim 7, wherein said control signals further comprise a data read/write signal from said processor to said data memory, said data read/write signal indicating which type of data access is being requested by said processor, a transfer of data from said processor to said data memory or a transfer of data to said processor from said data memory.

9. The apparatus of claim 7, wherein said control signals further comprise a data ready signal from said processor to said data memory, said data ready signal indicating when said processor is ready to transfer data from said data memory to said processor or when said processor is ready to transfer data from said processor to said data memory.

10. The apparatus of claim 7, wherein said control signals further comprise an instruction ready signal from said processor to said instruction memory, said instruction ready signal indicating when said processor is ready to transfer an instruction from said instruction memory to said processor.

11. The apparatus of claim 7, wherein said control signals further comprise a data address valid signal from said processor to said data memory, said data address valid signal indicating a valid data address on said address bus and an instruction address valid signal from said processor to said instruction memory, said instruction address valid signal indicating a valid instruction address on said address bus.

12. The apparatus of claim 11, wherein said data address valid signal and said instruction address valid signal indicate which of a data access and an instruction access is being requested by said processor.

* * * * *